United States Patent
Miller et al.

(10) Patent No.: US 10,486,626 B2
(45) Date of Patent: Nov. 26, 2019

(54) SYSTEMS AND METHODS FOR VEHICLE DIAGNOSTIC TESTER COORDINATION

(71) Applicant: Ford Global Technologies, LLC, Dearborn, MI (US)

(72) Inventors: Jason Michael Miller, Woodhaven, MI (US); William Robert Waldeck, Plymouth, MI (US); Eric Ramsay Paton, Sylvan Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 15/817,778

(22) Filed: Nov. 20, 2017

(65) Prior Publication Data

US 2019/0152411 A1    May 23, 2019

(51) Int. Cl.
  *B60R 16/02*   (2006.01)
  *B60R 16/023*  (2006.01)
  *H04L 12/40*   (2006.01)

(52) U.S. Cl.
  CPC ........ *B60R 16/0234* (2013.01); *H04L 2012/40215* (2013.01)

(58) Field of Classification Search
  CPC ............. B60R 16/0234; H04L 2012/40215
  See application file for complete search history.

(56) References Cited

U.S. PATENT DOCUMENTS

| | | | |
|---|---|---|---|
| 7,869,906 B2 | 1/2011 | Louch et al. | |
| 8,676,437 B2 * | 3/2014 | Yamada | G07C 5/008 701/29.1 |
| 9,489,544 B2 | 11/2016 | Naitou et al. | |
| 2007/0198147 A1 | 8/2007 | Keith et al. | |
| 2010/0205450 A1 * | 8/2010 | Sarnacke | B60R 25/00 713/185 |
| 2010/0293081 A1 * | 11/2010 | Liu | G05B 19/048 705/34 |
| 2011/0118933 A1 * | 5/2011 | Sakai | G07C 5/008 701/31.4 |
| 2011/0258431 A1 * | 10/2011 | Gundavelli | H04L 29/12254 713/150 |
| 2013/0031212 A1 * | 1/2013 | Enosaki | H04L 12/40 709/218 |
| 2013/0219170 A1 * | 8/2013 | Naitou | H04L 63/0428 713/153 |

(Continued)

FOREIGN PATENT DOCUMENTS

| | | |
|---|---|---|
| CN | 102354196 B | 6/1916 |
| CN | 101456392 B | 7/2011 |

(Continued)

*Primary Examiner* — Tyler J Lee
(74) *Attorney, Agent, or Firm* — Frank Lollo; Neal, Gerber & Eisenberg LLP; James P. Muraff

(57) ABSTRACT

Method and apparatus are disclosed for coordinating multiple vehicle diagnostic testers. An example vehicle includes communication buses, an electronic control unit (ECU) coupled to one of the communication buses, and a gateway module. The a gateway module is configured to receive a request for communication with the ECU from a first in-vehicle diagnostic (IVD) tester, and responsively prevent communication with a second IVD tester while facilitating communication between the first IVD tester and the ECU.

14 Claims, 3 Drawing Sheets

(56) References Cited

U.S. PATENT DOCUMENTS

| | | | | |
|---|---|---|---|---|
| 2014/0036693 A1* | 2/2014 | Mabuchi | ............... | H04L 43/10 |
| | | | | 370/243 |
| 2015/0372975 A1* | 12/2015 | Moriya | ............... | H04L 63/0209 |
| | | | | 726/12 |
| 2016/0012653 A1* | 1/2016 | Soroko | ............... | G07C 9/00007 |
| | | | | 340/5.61 |
| 2017/0026196 A1 | 1/2017 | Miners et al. | | |
| 2018/0072250 A1* | 3/2018 | Kim | ............... | H04W 24/00 |

FOREIGN PATENT DOCUMENTS

| | | | |
|---|---|---|---|
| CN | 102346472 A | 2/2012 | |
| JP | 2002077196 A | 3/2002 | |
| JP | 2004192277 A | 7/2004 | |
| WO | WO 2017023311 A1 | 2/1917 | |

* cited by examiner

SYSTEMS AND METHODS FOR VEHICLE DIAGNOSTIC TESTER COORDINATION

CROSS REFERENCE TO RELATED APPLICATION

This application is related to application number 15/818,511, filed on Nov. 20, 2017. The related application is hereby incorporated by reference in its entirety.

TECHNICAL FIELD

The present disclosure generally relates to vehicle system diagnostics and, more specifically, systems and methods for vehicle diagnostic tester coordination.

BACKGROUND

Modern vehicles may include many systems related to movement, power control, lighting, passenger comfort, and more. These systems are often electronically coupled together using a communication bus, so that one or more systems may issue commands, request information, and otherwise access data or information gathered by the various system.

Diagnostic information may be gathered, and used by one or more systems to provide indications to a driver (e.g., warning lights) as well as to provide information about the status of the various systems (e.g., emissions data, vehicle computer health, etc.).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for coordinating diagnostic testers of a vehicle communication network. An example disclosed vehicle includes communication buses, an electronic control unit (ECU) coupled to one of the communication buses; and a gateway module. The gateway module is configured to receive a request for communication with the ECU from a first in-vehicle diagnostic (IVD) tester, and responsively prevent communication with a second IVD tester while facilitating communication between the first IVD tester and the ECU.

An example disclosed method includes receiving, by a gateway module of a vehicle communication network, a request for communication between a first in-vehicle diagnostic (IVD) tester and an electronic control unit (ECU), wherein the vehicle communication network comprises a plurality of communication buses. The method also includes responsively preventing communication with a second IVD tester while facilitating communication between the first IVD tester and the ECU.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
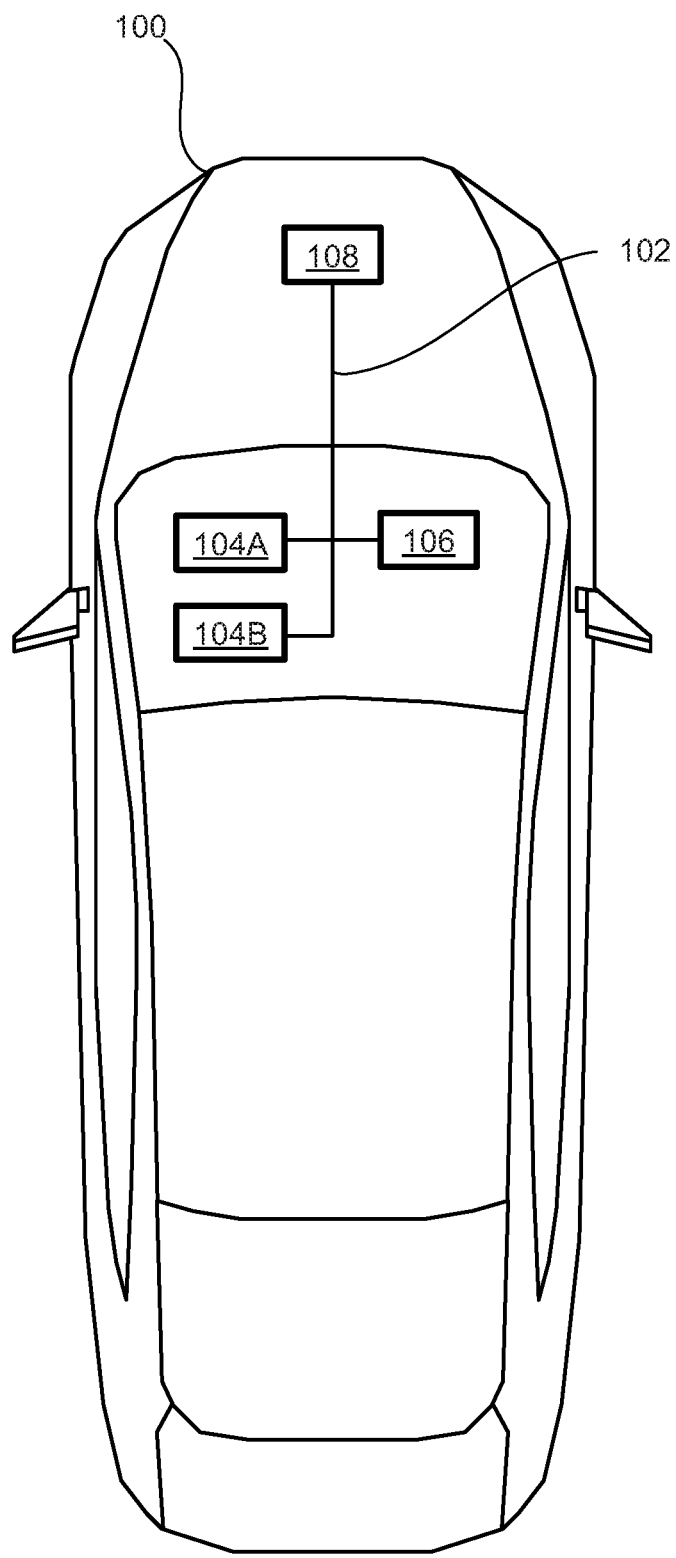
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, vehicles may include one or more systems or devices configured to collect information about the vehicle, and provide that information for use by one or more other systems or devices. Some such systems may be called on-board or in-vehicle diagnostic (OVD) testers. These IVD testers may be internal vehicle components configured to monitor the status of one or more vehicle systems, in order to provide warnings and alerts to the driver or other parties. A given vehicle may have a plurality of IVD testers, each configured to monitor and/or provide alerts for specific scenarios.

Vehicles may also include a port into which an off-board diagnostic tester can be plugged. The off-board diagnostic tester may be an aftermarket component, such as a vehicle insurance company plug-in that can be used to monitor speeds, vehicle usage, and other vehicle characteristics.

Vehicles may further include electronic control units (ECUs) that are configured to gather vehicle information via sensors, control various vehicle systems, and otherwise interact with other systems and devices on the vehicle communication network.

Some vehicles communication networks may include a plurality of distinct communication buses, that each are configured to allow communication between one or more ECUs, IVD testers, and other systems or devices. These communication buses (in addition to the various computing systems and devices) may be configured to operate using a CAN protocol.

In some examples, one or more IVD testers may require information from one or more ECUs in order to determine whether to provide an alert or take some other action. When multiple IVD testers request information at the same time, or where the requests overlap in time, the communication network may have difficulty processing the information and may be inadvertently put into a "bus off" state. This may be due to the structure of the CAN protocol by which the various components communicate, which may ordinarily allow only a single ID for receiving diagnostic requests. As such, a given ECU may receive multiple requests from multiple IVD testers, but may be unable to determine the source of the request or the destination to which the request information should be ultimately transmitted. This can lead to errors, dropped or unfulfilled diagnostic requests, and other such confusion on the vehicle communication network. These issues are especially present where multiple communication buses are present each having one or more IVD testers and ECUs. As such, there is a need for a way to allow multiple IVD testers to operate effectively on the same communication network along with an off-board diagnostic tester plugged into a port.

With the above described issues in mind, examples disclosed herein may include providing a network architecture that enables multiple IVD testers to co-exist and each request information from ECUs that may or may not be on the same communication bus. A gateway module may act to coordinate IVD tester requests and coordinate the dissemination of the requests to the various communication buses and/or ECUS, as well as the responses from the ECUs providing the requested information. In this manner, multiple IVD testers requesting information at the same time will not render the network unusable, and can be coordinated such that each request is processed in turn.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include a communication bus 102, IVD testers 104A and 104B, an ECU 106, and a gateway module 108.

Communication bus 102 may include one or more data buses that communicatively couple the various systems and devices of vehicle 100, including the IVD testers 104A and 104B, as well as the ECU 106 and gateway module 108. In some examples, communication bus 102 may be implemented in accordance with the controller area network (CAN) bus protocol as defined by International Standards Organization (ISO) 11898-1. Alternatively, in some examples, communication bus 102 may be a Media Oriented Systems Transport (MOST) bus, or a CAN flexible data (CAN-FD) bus (ISO 11898-7).

IVD testers 104A and 104B may include one or more processors and/or memory, and may be configured to request information regarding other vehicle systems, in order to determine whether an error or fault code, alert, or other warning should be provided to the driver or other party. Some IVD testers may be related to vehicle computing system health, vehicle emissions, vehicle engine characteristics, and more.

IVD testers 104A and 104B may be embedded in vehicle 100 and communicatively coupled to one or more communication buses such that they do not require access to an external port or plug-in to operate. As such, IVD testers 104A and 104B may be separate from a plug-in module coupled to the vehicle via an external port.

ECU 106 may monitor and control one or more subsystems of vehicle 100. ECU 106 may communicate and exchange information via communication bus 102. Additionally, ECU 106 may communicate properties (such as, status of the ECU 106, sensor readings, control state, error and diagnostic codes, etc.) to and/or receive requests from other ECUs, diagnostic testers, or other systems or devices. Some vehicles may have seventy or more ECUs located in various locations around the vehicle communicatively coupled by vehicle data bus 102. ECU 106 may be a discrete set of electronics that includes its own circuit(s) (such as integrated circuits, microprocessors, memory, storage, etc.) and firmware, sensors, actuators, and/or mounting hardware.

Some example ECUs may include an engine control unit, powertrain control module, body control module, driver seat module, driver door module, anti-lock brake system, telematics control unit, and more. Each ECU may include one or more sensors, systems, or devices configured to gather information about one or more vehicle characteristics particular to the given ECU.

In some examples, each ECU may be configured to receive a request for information, and responsively transmit the requested information via communication bus 102. Further, one or more ECUs may also include an IVD tester, which may be configured to request information from other ECUs for use by the ECU of which it is a part.

Gateway module 108 may include one or more processors and/or memory, and may be configured to carry out one or more actions or functions described herein. Where the vehicle includes multiple communication buses, gateway module 108 may be communicatively coupled to all the data buses. This may allow requests from an IVD tester on one bus to be distributed to one or more other buses which may be coupled to the particular ECU that is requested by the IVD tester.

Gateway module 108 may thus be configured to act as a go-between for IVD testers and ECUs that are coupled to the same or different communication buses. Gateway module 108 may further be configured to receive requests from various IVD testers and grant access one at a time, so that multiple requests are not active at the same time and confusion over the source, destination, and/or requested information does not occur.

Gateway module 108 may further be coupled to an external port configured to receive an off-board diagnostic tester, such as a manufacturer tool or insurance company plug-in tool.

Figure 2:
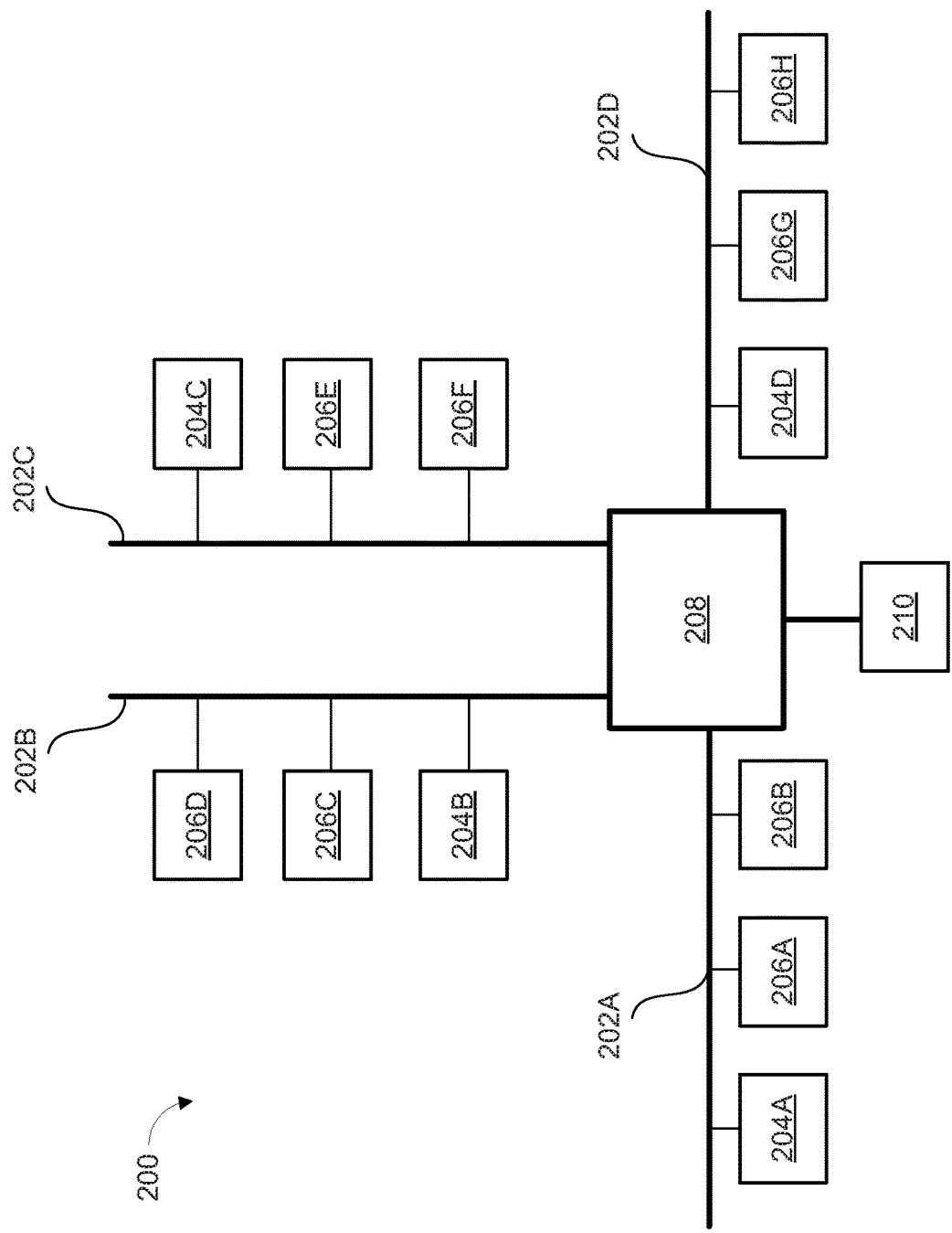
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include the gateway module 208, a plurality of IVD testers 204A-D, and a plurality of ECUs 206A-H, all communicatively coupled via a plurality of communication buses 202A-D. FIG. 2 also illustrates an external port 210 coupled to gateway module 208, configured to receive an off-board diagnostic tester.

Each ECU, IVD tester, and/or the gateway module may include a microcontroller unit, controller or processor and a memory. The processor may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The memory may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory, the computer readable medium, and/or within the processor during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

FIG. 2 illustrates that an example vehicle communication network may include a plurality of communication buses 202A-D. One or more of the buses may be high speed (e.g., 500 kbps or more), medium speed (e.g., 125 kbps) or any other speed. Each bus may be configured to couple one or more ECUs and/or IVD testers, which in some cases may be related (e.g., a given bus may couple the driver's seat module, driver's door module, and other driver side related ECUs).

Gateway module 208 may be configured to coordinate requests for information and/or communication with one or more ECUs by queuing the requests based on a time or arrival. In some examples, the gateway module 208 may determine a request priority, based on the ID of a requesting IVD tester, based on the ECU from which information is requested, or based on some other characteristic.

In order to coordinate the IVD testers, the gateway module 208 may first be configured to receive a request for communication with an ECU from a first IVD tester. The first IVD tester may be coupled to a first communication bus. For instance, the first IVD tester may be IVD tester 204A coupled to communication bus 202A. The ECU for which communication is requested by IVD tester 204A may be any ECU coupled to any communication bus. As such, the ECU may be coupled to the same communication bus as the first IVD tester 204A (i.e., communication bus 202A), or the ECU may be coupled to a different communication bus (i.e., communication buses 202B, 202C, or 202D). While FIG. 2 illustrates a particular number of communication buses, ECUs, and IVDs, other numbers may be used as well.

Responsive to receiving the request for communication with the ECU from the first IVD tester, the gateway module may be configured to prevent communication with a second IVD tester while facilitating the communication between the first IVD tester and the ECU. This may include preventing the second IVD tester from communicating with the ECU, from communicating with any other device of the communication network, or from communicating at all, for example. Preventing the second IVD tester from communicating while the first IVD tester is communicating with the ECU may prevent errors from occurring due to simultaneous requests for information.

In some examples, the second IVD tester may be coupled to the same communication bus as the first IVD tester. Alternatively, the second IVD tester may be coupled to a different communication bus than the first IVD tester. Further, the ECU may be coupled to a communication bus that is the same as or different from the communication bus to which the first and/or second IVD testers are coupled.

In some examples, the CAN protocol used by the vehicle communication network may not ordinarily include a source address for the IVD tester. As such, it may be difficult or impossible for an ECU or gateway module to determine the source of a request for information (e.g., whether it is from an off-board tester, an in-vehicle tester, and if so which in-vehicle tester). With this issue in mind, examples disclosed herein may include the IVD tester including a network management ID as a part of the request for communication with the ECU. The network management ID may be included as part of a network management message that is periodically sent to allow the network to wake and/or sleep. The gateway module may then determine the source of the request based on the received ID from the first IVD tester. The gateway module 208 may further determine the particular communication bus to which the first IVD tester is coupled.

The gateway module may then respond to the first IVD tester indicating that access to the ECU has been granted. The response may include the network management ID of the first IVD tester, the ID of the ECU, and/or another ID or other information that indicates access has been granted.

The first IVD tester may then transmit a second request, which may include the request for information from the ECU. This second request may be transmitted to the gateway module 208.

Gateway module 208 may receive the second request, and may responsively distribute it to one or more of the communication buses. In this manner, the IVD tester that is coupled to a first communication bus may be able to communicate with an ECU that is on any communication bus of the network via the gateway module 208. In some examples, the gateway module may broadcast the second request to all communication buses. Alternatively, the gateway module may transmit the second request to a subset of the communication buses, wherein the subset is determined based on the communication bus of the first IVD tester, the ECU from which information is requested, or based on another factor.

The ECU may then receive the request for information from the first IVD tester, and responsively transmit the requested information back to the gateway module. The gateway module may then relay the information to the first IVD tester via the communication bus to which it is coupled.

In some examples, the vehicle communication network may further include a port 210 configured to receive an off-board diagnostic tester. The port may be coupled to a communication network. The off-board diagnostic tester may be plugged in to port 210, and may be a diagnostic tool used by a manufacturer or repair technician, an insurance company plug-in, or another type of plug-in or tool. The gateway module 208 may be configured to detect the presence of an off-board diagnostic tester coupled to port 210, and determine that the plugged in tester should override or take priority over the IVD testers. As such, the gateway module 208 may responsively prevent communication with the first IVD tester and one or more other IVD testers. This can ensure compliance with any regulations or rules that require no interference with service tools.

Figure 3:
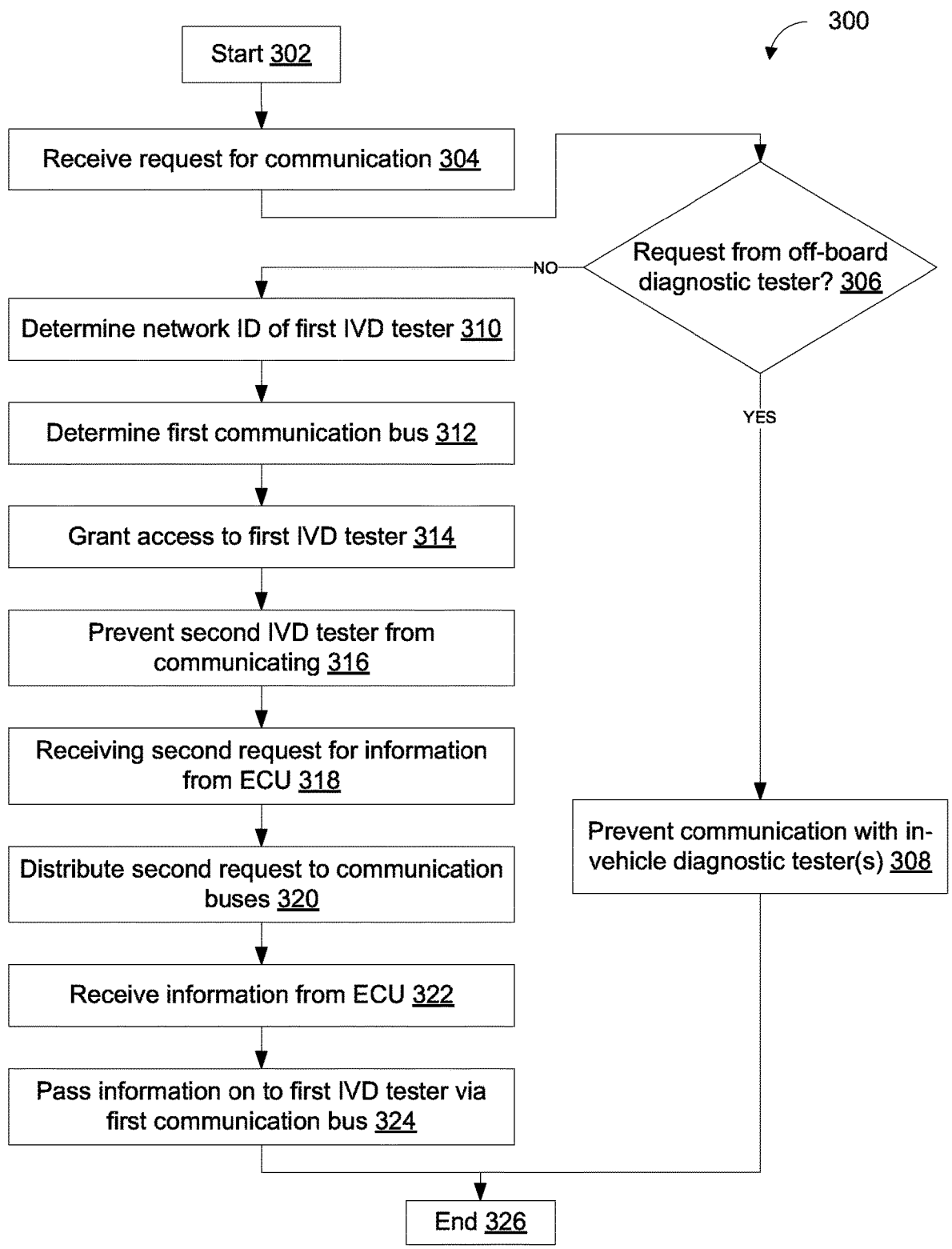
FIG. 3 illustrates a flowchart of an example method according to embodiments of the present disclosure.

FIG. 3 illustrates a flowchart of an example method 300 according to embodiments of the present disclosure. Method 300 may enable a vehicle having multiple IVD testers to coordinate and process information requests from one or more ECUs on a plurality of communication buses. The flowchart of FIG. 3 is representative of machine readable instructions that are stored in memory and may include one or more programs which, when executed by a processor may cause vehicle 100 and/or one or more systems or devices to carry out one or more functions described herein. While the example program is described with reference to the flowchart illustrated in FIG. 3, many other methods for carrying out the functions described herein may alternatively be used. For example, the order of execution of the blocks may be rearranged or performed in series or parallel with each other, blocks may be changed, eliminated, and/or combined to perform method 300. Further, because method 300 is disclosed in connection with the components of FIGS. 1-2, some functions of those components will not be described in detail below.

Method 300 may start at block 302. At block 304, method 300 may include receiving a request for communication with an ECU from a first IVD tester. The request may be received by the gateway module.

At block 306, method 300 may include determining whether the received request came from an off-board diagnostic tester plugged into an external port or not. If the request did come from the off-board diagnostic tester, method 300 may include the gateway module preventing communication with one or more IVD testers on the communication network. This may prevent interference from the IVD testers while the off-board diagnostic tester is active.

At block 310, method 300 may include determining a network ID of the first IVD tester from which the request was received. The network ID may be a network management ID included as part of the request. At block 312, method 300 may include determining the first communication bus, to which the first IVD tester is coupled. Then at block 314, method 300 may include the gateway module granting access to the first IVD tester, which may include transmitting a message on the first communication bus that include the network ID of the first IVD tester, the ID of the ECU corresponding to the request, or some other information.

At block 316, method 300 may include preventing a second IVD tester from communicating. This may include denying any requests from the second IVD tester, or otherwise preventing the second IVD tester from transmitting a request. In some examples, the network architecture may be such that all IVD testers are prevented from transmitting requests for information from ECUs by default, such that only after the gateway module has granted access can a request for information be sent to the ECU from the IVD tester.

At block 318, method 3200 may include receiving, from the first IVD tester, a second request for information from the ECU. The first request may be a request for access to the ECU, and the second request may include a specific request for information from the ECU. At block 320, method 300 may include distributing the second request to one or more communication buses. The gateway module may distribute the second request to all communication buses, or a subset of communication buses depending on the content of the request, the first IVD tester, the ECU from which information is requested, or some other factor. In this manner, while the request may come from a first IVD tester that is coupled to a first communication bus, the gateway module can provide access to ECUs that are coupled to communication buses that include both the first communication bus and all others.

At block 322, method 300 may include receiving, by the gateway module, information from the ECU. The ECU may provide the requested information to the gateway module, which may then pass or relay the information on to the first IVD tester via the first communication bus at block 324. In this manner, the gateway module may be configured to grant a given IVD tester access to ECUs on all communication buses, and be able to route the information back to the communication bus coupled to the IVD tester. Method 300 may then end at block 326. In some examples, method 300 may then go back to block 304, to receive a second request for communication with an ECU. Method 300 may thus repeat one or more steps where there is a queue of IVD tester requests for information.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   communication buses;
   an electronic control unit (ECU) coupled to one of the communication buses; and
   a gateway module coupled to the communication buses, the gateway module configured to:
     receive a first request for communication with the ECU from a first in-vehicle diagnostic (IVD) tester;
     responsively prevent communication with a second IVD tester while facilitating communication between the first IVD tester and the ECU;
     receive a second request for information from the ECU from the first IVD tester; and
     responsive to receiving the second request, distribute the second request to all of the communication buses.

2. The vehicle of claim 1, wherein the gateway module is further configured to communicatively couple the communication buses, and wherein the communication buses are configured to operate using a CAN bus protocol.

3. The vehicle of claim 1, wherein the first IVD tester is coupled to a first communication bus, and wherein the ECU is coupled to a second communication bus.

4. The vehicle of claim 1, wherein the second IVD tester is coupled to a first communication bus, and the ECU is coupled to a second communication bus.

5. The vehicle of claim 1, wherein the first request comprises a network ID of the first IVD tester, and wherein the gateway module is further configured to transmit a response to the first IVD tester indicating access to the ECU is granted.

6. The vehicle of claim 1, further comprising a port configured to receive an off-board diagnostic tester, the communication buses comprising a first communication bus, the port coupled to the first communication bus.

7. The vehicle of claim 6, wherein the gateway module is further configured to:
   detect the presence of the off-board diagnostic tester coupled to the port; and
   responsively prevent communication with the first IVD tester and the second IVD tester.

8. A method comprising:
   receiving, by a gateway module of a vehicle communication network, a first request for communication between a first in-vehicle diagnostic (IVD) tester and an electronic control unit (ECU), wherein the vehicle communication network comprises a plurality of communication buses, and wherein the gateway module is coupled to the plurality of communication buses;
   responsively preventing communication with a second IVD tester while facilitating communication between the first IVD tester and the ECU;
   receiving a second request for information from the ECU from the first IVD tester; and
   responsive to receiving the second request, distributing the second request to all of the plurality of communication buses.

9. The method of claim 8, further comprising communicatively coupling the communication buses via the gateway module, wherein the communication buses are configured to operate using a CAN bus protocol.

10. The method of claim 8, wherein the first IVD tester is coupled to a first communication bus, and wherein the ECU is coupled to a second communication bus.

11. The method of claim 8, wherein the second IVD tester is coupled to a first communication bus, and the ECU is coupled to a second communication bus.

12. The method of claim 8, wherein the first request comprises a network ID of the first IVD tester, the method further comprising:
   transmitting, by the gateway module, a response to the first IVD tester indicating access to the ECU is granted.

13. The method of claim 8, wherein the plurality of communication buses comprises a first communication bus, and wherein a port configured to receive an off-board diagnostic tester is coupled to the first communication bus.

14. The method of claim 13, further comprising:
   detecting, by the gateway module, the presence of the off-board diagnostic tester coupled to the port; and
   responsively preventing communication with the first IVD tester and the second IVD tester.

* * * * *